Feb. 4, 1941. H. W. KOST 2,230,355
FASTENER
Filed Aug. 5, 1939
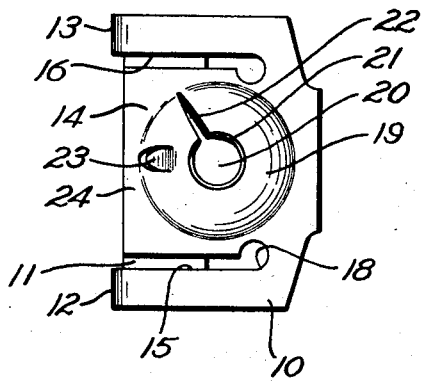
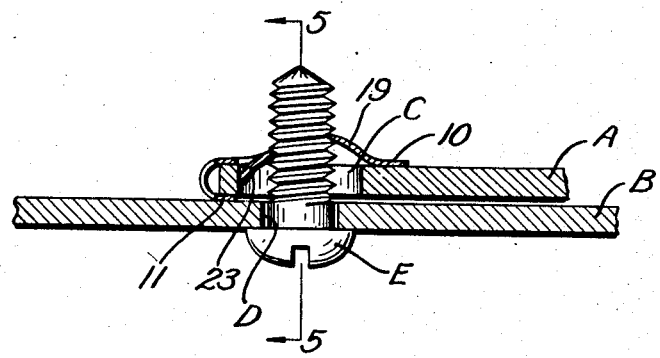
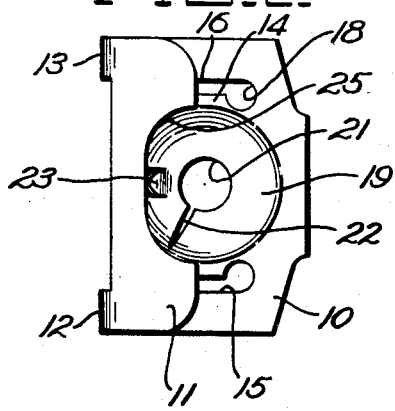
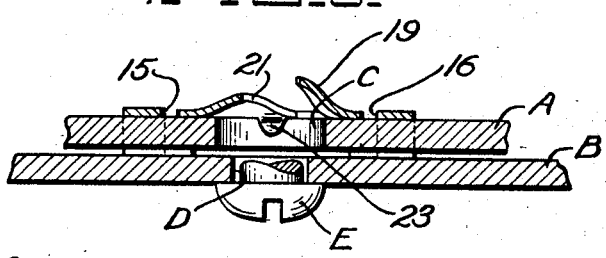
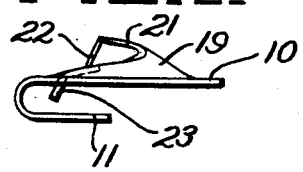
Inventor
Harold W. Kost
By
Malcolm W. Fraser
Attorney Patented Feb. 4, 1941

2,230,355

UNITED STATES PATENT OFFICE 2,230,355

FASTENER

Harold W. Kost, Birmingham, Mich., assignor to Detroit Harvester Company, Detroit, Mich., a corporation of Michigan Application August 5, 1939, Serial No. 288,607

2 Claims. (Cl. 85—32)

This invention relates to fastening devices of sheet material in which a portion of the sheet material is deformed for threadedly engaging a screw-threaded connecting shank and an object is to provide a fastener of this character with new and improved means for resiliently mounting a tongue used for holding or centering said fastener in position and militating against displacement, thereby to facilitate the connecting together of parts, such, for example, as certain parts of an automobile which are not readily visible or accessible and are consequently troublesome to join.

Other objects and advantages will hereinafter appear and for purposes of illustrtion but not of limitation, an embodiment of the invention is shown on the accompanying drawing, in which Figure 1 is a top plan view of a fastener;

Figure 2 is a bottom plan view of the fastener;

Figure 3 is a side elevation of the fastener;

Figure 4 is a longitudinal sectional elevation of the fastener applied to a structure to be joined; and Figure 5 is a transverse sectional elevation substantially on the line 5—5 of Figure 4, a portion of the screw being broken away.

The illustrated embodiment of the invention comprises a fastener consisting of a relatively thin strip of sheet material, such as sheet metal, folded upon itself to provide flanges 10 and 11, which are substantially parallel to one another and integrally joined by arms 12 and 13. The flanges are spaced from each other an amount corresponding substantially to the thickness of the panel to which the fastener is applied. Formed in the flange 10 is a peninsular flap 14 which is integrally connected at its inner end only with the body of the fastener or the flange 10, and separated from arms 12 and 13 by parallel slits 15 and 16 which have their rear ends enlarged at 18 to afford greater flexibility to the flap.

Formed in the flange 10 is an outwardly pressed frusto-conical protuberance 19 apertured at 20, the wall 21 of the aperture being helical and the protuberance being formed with a radial slit 22 in order to enable the wall of the aperture to engage a thread of a screw-threaded shank of a bolt or screw E. The formation of the protuberance from a general aspect forms no part of this invention, since the thread-receiving portion may be any one of several forms without departing from the spirit of the invention. More detailed description of said protuberance, for this reason, is not considered necessary and reference is hereby made to the patent to Bion C. Place No. 2,081,065, wherein the structure is more fully described.

In this instance, a portion of the wall of the protuberance in the region of the slit 22 is struck out to form a depending tongue or prong 23 which is bent inwardly or downwardly toward the flange 11. As shown, the tongue 23 inclines slightly toward the free end 24 of the flap in order to facilitate the sliding of the tongue along a panel. The tongue 23 is adapted to extend into an opening C formed in the panel A with which the screw receiving opening 20 is adapted to register. The tongue engages an edge portion of the opening C thereby militating against displacement of the fastener and operating automatically to bring the openings into registration. The open end of flange 11 is cut away to form a recess 25 to afford adequate clearance for the screw E.

In use, it will be apparent that the flanges 10 and 11 are slipped over opposite sides of the panel A and during such movement, the flap 14 flexes outwardly to allow the tongue 23 to ride along the surface of panel A until it reaches the opening C whereupon the resiliency of the flap causes the tongue 23 to snap into the opening. When the fastener is in this position, the screw E is readily passed through an opening D in the panel B, and then through the opening C and into screw-threaded engagement with the protuberance 19, thereby securely joining the parts together.

It will be apparent that the fastener may constitute a flat body formed with a resiliently mounted prong, instead of the U-shape structure above described. It will also be understood that other forms of thread engaging portions may be employed without departing from the purview of the invention.

It is to be understood that numerous changes in details of construction, arrangement and operation may be effected without departing from the spirit of the invention especially as defined in the appended claims.

What I claim is:

1. A fastener comprising a sheet metal body having a pair of laterally spaced substantially parallel slits therein, each slit having one end terminating near one edge of said body and the other end terminating at the opposite edge of said body thereby to form a co-planar peninsular flap integrally connected at one edge to said body and free at its opposite edge, a thread receiving portion on said flap, a prong depending from said flap and adapted to enter an opening of a part to be joined, said slits also providing a relatively narrow arm at opposite sides of said flap, a flange substantially parallel with and beneath said body, and an integral hinge connection between each side arm and said flange.

2. A fastener comprising a sheet metal body having a pair of laterally spaced substantially parallel slits therein, each slit having one end terminating near one edge of said body and the other end terminating at the opposite edge of said body thereby to form a co-planar peninsular flap integrally connected at one edge to said body and free at its opposite edge, a thread receiving portion on said flap, a prong depending from said flap and adapted to enter an opening of a part to be joined, said slits also providing a relatively narrow arm at opposite sides of said flap, a flange substantially parallel with and beneath said body, said flange of substantially less width than said body, a cut-away portion on said flange to afford clearance for a screw, and an integral hinge connection between each side arm and said flange.

HAROLD W. KOST.